US010935562B2

(12) United States Patent
Zhou et al.

(10) Patent No.: US 10,935,562 B2
(45) Date of Patent: Mar. 2, 2021

(54) METHOD AND DEVICE FOR MEASURING FLIGHT PARAMETERS OF AN UNMANNED AERIAL VEHICLE

(71) Applicant: SZ DJI TECHNOLOGY CO., LTD., Shenzhen (CN)

(72) Inventors: Wancheng Zhou, Shanghai (CN); Ke Sun, Shenzhen (CN); Yun Yu, Shenzhen (CN); Liming Huang, Shenzhen (CN)

(73) Assignee: SZ DJI Technology Co., Ltd., Shenzhen (CN)

( * ) Notice: Subject to any disclaimer, the term of this patent is extended or adjusted under 35 U.S.C. 154(b) by 0 days.

(21) Appl. No.: 16/556,526

(22) Filed: Aug. 30, 2019

(65) Prior Publication Data

US 2020/0011892 A1 Jan. 9, 2020

Related U.S. Application Data

(63) Continuation of application No. 15/303,419, filed as application No. PCT/CN2014/075103 on Apr. 10, 2014, now Pat. No. 10,401,375.

(51) Int. Cl.
*G06K 9/00* (2006.01)
*G01P 3/38* (2006.01)
(Continued)

(52) U.S. Cl.
CPC .............. *G01P 3/38* (2013.01); *B64C 39/024* (2013.01); *B64D 47/08* (2013.01); *G06K 9/0063* (2013.01);
(Continued)

(58) Field of Classification Search
None
See application file for complete search history.

(56) References Cited

U.S. PATENT DOCUMENTS 7,611,098 B2 11/2009 Van Boven
2003/0118213 A1 6/2003 Parker
(Continued)

FOREIGN PATENT DOCUMENTS

CN 102175882 9/2011
CN 102298070 12/2011
(Continued)

OTHER PUBLICATIONS

International Search Report dated Dec. 30, 2014, in counterpart International Application No. PCT/CN2014/075103; 7 pages.
(Continued)

*Primary Examiner* — Wei Wen Yang
(74) *Attorney, Agent, or Firm* — Finnegan, Henderson, Farabow, Garrett & Dunner, LLP (57) ABSTRACT

A method and a device for measuring flight parameters of an unmanned aerial vehicle (UAV) are provided, the method includes, capturing images and collecting an angular velocity of the UAC, extracting corner points from a current frame image, estimating an estimated area according to the angular velocity of the UAV, searching for a corresponding corner point in the estimated area, obtaining a speed of each of the corner points, obtaining a pixel velocity, and obtaining an actual speed of the UAV based on the pixel velocity and a flight altitude of the UAV.

20 Claims, 3 Drawing Sheets

(51) Int. Cl.
*B64C 39/02* (2006.01)
*B64D 47/08* (2006.01)
*G06K 9/46* (2006.01)
*G06T 7/246* (2017.01)

(52) U.S. Cl.
CPC ......... *G06K 9/4604* (2013.01); *G06K 9/4628* (2013.01); *G06K 9/4642* (2013.01); *G06T 7/246* (2017.01); *G06T 2207/20072* (2013.01); *G06T 2207/20164* (2013.01); *G06T 2207/30241* (2013.01); *G06T 2207/30248* (2013.01)

(56) References Cited

U.S. PATENT DOCUMENTS

| | | |
|---|---|---|
| 2011/0049290 A1 | 3/2011 | Seydoux et al. |
| 2011/0206236 A1 | 8/2011 | Center, Jr. |
| 2011/0311099 A1 | 12/2011 | Derbanne |
| 2013/0135217 A1* | 5/2013 | Honji ................. G06F 3/041 345/173 |
| 2015/0124174 A1 | 5/2015 | Naftali et al. |

FOREIGN PATENT DOCUMENTS

| | | |
|---|---|---|
| CN | 103344979 | 10/2013 |
| CN | 103913588 | 7/2014 |
| CN | 103914075 | 7/2014 |

OTHER PUBLICATIONS

Office Action issued by the Chinese Patent Office in counterpart Chinese Patent Application No. 201610461573.3, dated May 31, 2018.

\* cited by examiner

METHOD AND DEVICE FOR MEASURING FLIGHT PARAMETERS OF AN UNMANNED AERIAL VEHICLE

CROSS-REFERENCE TO RELATED PATENT APPLICATIONS

This application is a continuation of U.S. application Ser. No. 15/303,419, filed Oct. 11, 2016, which is a national phase application of International Application No. PCT/CN2014/075103, filed Apr. 10, 2014, the content of which is incorporated herein by reference in its entirety.

TECHNICAL FIELD

The present disclosure relates to an unmanned aerial vehicle (UAV), and particularly, to a method and device for measuring flight parameters of an UAV.

BACKGROUND OF THE INVENTION

An unmanned aerial vehicle is an aerial vehicle without a human pilot onboard, and is controlled by a radio remote controller or an autonomous program. Flight parameters of UAV (e.g., flight velocity) may be required to control a flight attitude of the UAV where a GPS (Global Positioning System) information is not available and a flight attitude of UAV is to be controlled, for example, in hovering.

An existing method of measuring flight parameters of a UAV where GPS information is not available may comprise: extracting simple feature points from images captured by a camera sensor; measuring a pixel velocity by a block matching method; and calculating a flight speed of the UAV based on an altitude information obtained by an ultrasonic sensor and the pixel velocity.

In the prior art, significant errors or faults may occur in the calculated pixel velocity since the feature points extracted from the images may not be corner points. In some instances, the block matching method may only measure a velocity of one pixel, which may lower a precision of measurement. For instance, a flight speed may be calculated as zero while the UAV is moving at a low speed. Furthermore, in the prior art, a change in pixel velocity by a rotation of the UAV may not be corrected before the pixel velocity is calculated; therefore, an effect on the pixel velocity caused by a rotation of UAV may not be completely removed. In the prior art, a range of measurement of UAV speed may be limited and fail to meet a need in practical applications.

SUMMARY OF THE INVENTION

The present disclosure provides a method and device for measuring flight parameters of a UAV with high accuracy and precision.

In order to address the technical problems discussed hereinabove, the present disclosure provides a method of measuring flight parameters of an unmanned aerial vehicle (UAV). The method may comprise: capturing images and collecting an angular velocity of the UAV; extracting corner points from a current frame image; estimating, for each of the corner points in the current frame image, an estimated area in a previous frame image within which the corner point in the current frame image locates, according to the angular velocity of the UAV; searching for a corresponding corner point within each of the estimated areas in the previous frame image, according to the position of each of the corner points in the current frame image; obtaining a speed of each of the corner points according to the corner point in the current frame image and the corresponding corner point in the previous frame image; obtaining a pixel velocity according to the speeds of the corner points; and obtaining an actual speed of the UAV based on the pixel velocity and a flight altitude of the UAV.

In some embodiments, the step of extracting corner points from the current frame image may include: performing a pyramid decomposition on the current frame image; obtaining gray-scale gradients in the horizontal direction and the vertical direction of each pixel in the top image layer of the current frame image, wherein the top image layer locates at the top of the pyramid in the pyramid decomposition; obtaining an integral image corresponding to the top image layer of the current frame image, based on the gray-scale gradients in the horizontal direction and the vertical direction; and obtaining a Harris score of each pixel in the top image layer of the current frame image based on the integral image, and extracting the corner points in the current frame image based on the Harris score, wherein the corner points may be pixels having a Harris score greater than a predetermined threshold.

In some embodiments, the step of estimating, for each of the corner points in the current frame image, an estimated area in a previous frame image within which the corner point in the current frame image locates, according to the angular velocity of the UAV may include: performing a pyramid decomposition on the previous frame image; integrating the collected angular velocity over the time interval between the current frame image and the previous frame image, to obtain a rotational angle of the UAV during the time interval; calculating, for each of the corner points in the current frame image, a corresponding pixel displacement in a top image layer of the previous frame image, based on the rotational angle; and estimating, for each of the corner points in the current frame image, an estimated area in the top image layer of the previous frame image, based on the corresponding pixel displacement.

In some embodiments, the step of searching for the corresponding corner point within each of the estimated areas in the previous frame image, according to the position of each of the corner point in the current frame image may include: extracting corner points from the previous frame image; determining if a corner point is found within each of the estimated area in the previous frame image which is corresponding to each of the corner points in the current frame image; and searching, within the each of the estimated areas in the previous frame, for corner point corresponding to the corner point in the current frame.

In some embodiments, the step of obtaining the speeds of the corner points according to the corner points in the current frame image and the corresponding corner points in the previous frame image may include: obtaining a speed of each of the corner points in the top image layer according to each of the corner points in the current frame image and each of the corner points in the previous frame image, by a pyramid optical flow method; and obtaining successively a speed of each of the corner points in each of image layers other than the top image layer in the pyramid according to the speed of each of the corner points in the top image layer, by the pyramid optical flow method, wherein a speed of the corner point in a bottom image layer in the pyramid is the speed of the corner point.

In some embodiments, the step of obtaining the pixel velocity according to the speeds of the corner points may include: obtaining an average value of the speeds of the corner points as a first average value; determining a correlation between the speed of each of the corner points and the first average value; and obtaining an average value of those corner points which are positively correlated with the first average value, as a second average value, wherein the second average value is the pixel velocity.

In some embodiments, the step of obtaining the pixel velocity according to the speeds of the corner points may include: obtaining a histogram of the speeds of the corner points and performing a low-pass filtering on the histogram, wherein a mode obtained from the filtered histogram is the pixel velocity.

In some embodiments, the step of obtaining the actual speed of the UAV based on the pixel velocity and a flight altitude of the UAV may include: obtaining a rotational pixel velocity of the UAV caused by a rotation based on the angular velocity; obtaining a translational pixel velocity of the UAV caused by a translation by subtracting the rotational pixel velocity caused by the rotation from the pixel velocity obtained according to the speeds of the corner points; and obtaining the actual speed of the UAV according to the translational pixel velocity and the flight altitude of the UAV.

In some embodiments, a SIMD instruction set of a processor may be used to perform a synchronous calculation on a plurality of pixels in the step of extracting corner points from the current frame image, the step of searching for the corresponding corner point within each of the estimated areas in the previous frame image, according to the position of each of the corner point in the current frame image, and the step of obtaining the speed of each of the corner point according to the corner point in the current frame image and the corresponding corner point in the previous frame image.

In order to address the technical problem discussed hereinabove, the present disclosure provides a device for measuring flight parameters of an unmanned aerial vehicle (UAV). The device may comprise: an image sensor configured to capture images; a gyroscope configured to collect an angular velocity of the UAV; an altimeter configured to obtain a flight altitude of the UAV; and a processor electrically connected with the image sensor, the gyroscope and the altimeter, said processor may be configured to: extract corner points from a current frame image captured by the image sensor; estimate, for each of the corner points in the current frame image, an estimated area in a previous frame image within which the corner points in the current frame image locates, according to the angular velocity of the UAV collected by the gyroscope; search for a corresponding corner point within each of the estimated areas in the previous frame image, according to the position of each of the corner points in the current frame image; obtain a speed of each of the corner points according to the corner point in the current frame image and the corresponding corner point in the previous frame image; obtain a pixel velocity according to the speeds of the corner points; and obtain an actual speed of the UAV based on the pixel velocity and the flight altitude of the UAV obtained by the altimeter.

the processor may be further configured to: perform a pyramid decomposition on the current frame image; obtain gray-scale gradients in the horizontal direction and the vertical direction of each pixel in the top image layer of the current frame image, wherein the top image layer locates at the top of the pyramid in the pyramid decomposition; obtain an integral image corresponding to the top image layer of the current frame image based on the gray-scale gradients in the horizontal direction and the vertical direction; obtain a Harris score of each pixel in the top image layer of the current frame image based on the integral image; and extract the corner points in the current frame image based on the Harris score, wherein the corner points are pixels having a Harris score greater than a predetermined threshold.

In some embodiments, the processor may be further configured to: perform a pyramid decomposition on the previous frame image; integrate the collected angular velocity over the time interval between the current frame image and the previous frame image, to obtain a rotational angle of the UAV during the time interval; calculate, for each of the corner points in the current frame image, a corresponding pixel displacement in the top image layer of the previous frame image, based on the rotational angle; and estimate, for each of the corner points in the current frame image, an estimated area in the top image layer of the previous frame image, based on the corresponding pixel displacement.

In some embodiments, the processor may be further configured to: extract corner points from the previous frame image; determine if a corner point is found within each of the estimated area in the previous frame image which is corresponding to each of the corner points in the current frame image; and search, within the each of the estimated areas in the previous frame, for corner point corresponding to the corner point in the current frame.

In some embodiments, the processor may be further configured to: obtain a speed of each of the corner points in the top image layer according to each of the corner points in the current frame image and each corner points in the previous frame image, by a pyramid optical flow method; and obtain successively a speed of each of the corner points in each of image layers other than the top image layer in the pyramid according to the speed of each of the corner points in the top image layer, by the pyramid optical flow method, wherein a speed of the corner point in a bottom image layer in the pyramid may be the speed of the corner point.

In some embodiments, the processor may be further configured to: obtain an average value of the speeds of the corner points as a first average value; determine a correlation between the speed of each of the corner points and the first average value, and obtain an average value of those corner points which are positively correlated with the first average value, as a second average value, wherein the second average value may be the pixel velocity.

In some embodiments, the processor may be further configured to obtain a histogram of the speeds of corner points and performing a low-pass filtering on the histogram, wherein a mode obtained from the filtered histogram may be the pixel velocity.

In some embodiments, the processor may be further configured to: obtain a rotational pixel velocity of the UAV caused by a rotation based on the angular velocity; obtain a translational pixel velocity of the UAV caused by a translation by subtracting the rotational pixel velocity caused by the rotation from the pixel velocity obtained according to the speeds of the corner points; and obtain the actual speed of the UAV according to the translational pixel velocity and the flight altitude of the UAV.

In some embodiments, the processor may be further configured to use a SIMD instruction set to perform a synchronous calculation on a plurality of pixels, to execute operations of extracting corner points from a current frame image, the step of searching for the corresponding corner point within each of the estimated areas in the previous frame image, according to the position of each of the corner point in the current frame image, and the step of obtaining the speed of each of the corner point according to the corner point in the current frame image and the corresponding corner point in the previous frame image.

The advantageous effects of the present disclosure is in that, distinguished from the prior arts, the technical solutions of present disclosure may include the following processes: extracting corner points from a current frame image; estimating corresponding corner points in a previous frame image based on an angular velocity and the corner points in the current frame image; appropriately processing the corner points in the current frame image and the corner points in the previous frame image to calculate a pixel velocity; and obtaining an actual speed of the UAV based on the pixel velocity and a flight altitude of the UAV. Compared with the methods in prior art, the technical solution of present disclosure may calculate the flight parameters of aerial vehicle based on corner points and make pre-compensation to the angular velocity instead of post-compensation, thereby improving an accuracy and a precision of the flight parameters measurement.

DETAILED DESCRIPTION OF THE INVENTION

Particular terms are used throughout the specification and claims to refer to specific components. Those skilled in the art would appreciate that, manufacturers may use different terms for the same component. Components are not differentiated by different terms, but by different functionalities throughout the specification and claims. The present disclosure will be described in detail with reference to drawings and embodiments.

Figure 1:
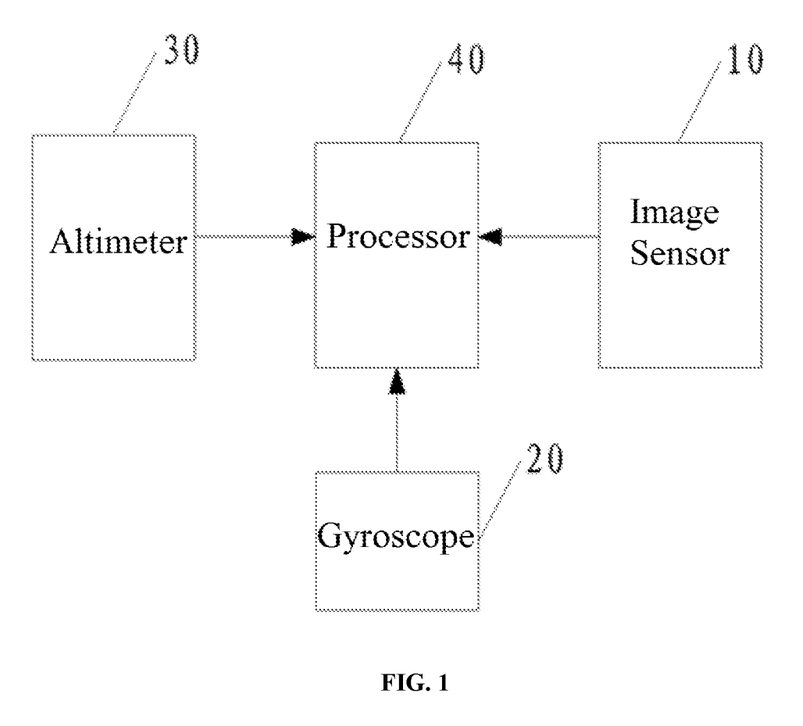
FIG. 1 is a structure diagram of a device for measuring flight parameters of a UAV, according to an embodiment of the present disclosure.

FIG. 1 is a structure diagram of a device for measuring flight parameters of a UAV, according to an embodiment of the present disclosure. As shown in FIG. 1, the device may comprise an image sensor 10, a gyroscope 20, an altimeter 30 and a processor 40.

In some embodiments, the image sensor 10 may be configured to obtain images at a first preset frequency. In some instances, the image sensor may be an MT9V034 supporting a maximum resolution of 752×480. In some instances, the first preset frequency may be 50 Hz (Hertz).

In some embodiments, the gyroscope 20 may be configured to collect the angular velocity of a UAV at a second preset frequency. In some instances, the second preset frequency may be a high frequency, such as 1 KHz (kilohertz).

In some embodiments, the altimeter 30 may be configured to obtain the flight altitude of a UAV. In some instances, the altimeter 30 may be an ultrasonic sensor. For instance, a probe of the ultrasonic sensor may transmit an ultrasonic wave having a frequency of about 300-500 KHz towards the ground. The ultrasonic wave may be reflected when it reaches the ground capable of reflecting the ultrasonic wave. The reflected wave may be received by the same probe or another probe of the ultrasonic sensor. The ultrasonic sensor may measure a time difference between the moment the ultrasonic wave is transmitted and the moment reflected wave is received. The distance between the ultrasonic sensor and the ground may be calculated based on the propagation speed (e.g., generally 340 m/s) of ultrasonic wave in air. Optionally, the altimeter 30 may be other types of measurement devices such as an infrared sensor, a laser sensor or a microwave device, etc.

In some embodiments, the processor 40 may be an embedded processor electrically connected with the image sensor 10, the gyroscope 20 and the altimeter 30. In some instances, the processor 40 may be a Cortex M4 processor which is connected with the image sensor 10 via a DCMI (digital camera interface) interface or an LVDS (low voltage differential signaling) interface, connected with the gyroscope 20 via an I2C (inter-integrated circuit) interface, and connected with the altimeter 30 via a UART (universal asynchronous receiver/transmitter) interface. Optionally, the processor 40 may be other types of embedded processors or other processors, and not limited by the embodiments herein. In some embodiments, the processor 40 may be configured to: (1) extract corner points from a current frame image captured by the image sensor 10; (2) estimate estimated areas in a previous frame image within which the corner points in the current frame image locate, according to the current angular velocity of a UAV collected by the gyroscope 20; (3) search for corresponding corner points within the estimated areas in the previous frame image, according to the locations of the corner points in the current frame image; (4) obtain the speeds of the corner points, according to the corner points in the current frame image and the corresponding corner points in the previous frame image; (5) obtain pixel velocity according to the speeds of the corner points; and (6) obtain the actual speed of the UAV according to the pixel velocity and the flight altitude of the UAV obtained by the altimeter 30. In some embodiments, as the gyroscope 20 detects a rotation of the UAV, the processor 40 may calculate a rotational pixel velocity caused by the rotation of the UAV based on the angular velocity detected by the gyroscope 20, and obtain the translational pixel velocity of the UAV caused by a translation of the UAV by subtracting the rotational pixel velocity from the pixel velocity obtained from the speeds of the corner points. The actual speed of the UAV may be calculated based on the translational pixel velocity caused by the translation of UAV and the flight altitude obtained by the altimeter 30.

In some embodiments, the processor 40 may be a processor supporting Single Instruction Multiple Data (SIMD) instruction set. In some instances, SIMD instruction set may be a subset of Thumb instruction set. In some embodiments, the processor 40 may perform synchronous calculation on a plurality of pixels by using SIMD instruction set, thereby executing operations of extracting corner points from a current frame image, searching for corresponding corner points from estimated areas in a previous frame image according to the locations of the corner points in the current frame image, and obtaining the speeds of the corner points according to the corner points in the current frame image and the corresponding corner points in the previous frame image. The use of SIMD instruction set may significantly increase the execution efficiency of the operations, thereby reducing the execution time of the operations and increasing the precision of flight parameters measurement.

In some embodiments, the operation of the processor 40 for extracting corner points from a current frame image obtained by the image sensor 10 may comprise the following processes. First, the processor 40 may perform pyramid decomposition on the current frame image obtained by the image sensor 10. Next, the processor 40 may obtain gray-scale gradients in the horizontal direction and the vertical direction of each pixel in the top image layer of the current frame image, the top image layer may locate at the top of the pyramid in the pyramid decomposition. In some instances, in the process of calculating the gray-scale gradients, SIMD instruction set may be used to perform synchronous calculation on a plurality of pixels in order to increase the calculation speed. For instance, by virtue of array characteristic, every 4 bytes having successive addresses may be combined into a 32-bit integer, and a calculation may be performed by using SIMD instruction set with the calculation speed four times faster. Next, the processor 40 may obtain the integral image corresponding to the top image layer of the current frame image based on the gray-scale gradients in the horizontal direction and the vertical direction. In some instances, in the process of calculating the integral image, Thumb instruction set may be used to increase the speed of calculating the integral image. For instance, instructions, such as _SMLABB, _SMLABT, _SMLATB in Thumb instruction set, may be used to complete a multiplication and addition calculation of 16-bit integer in one clock cycle, thereby increasing the speed of calculating the integral image. Then, the processor 40 may obtain the Harris score of each pixel in the top image layer of the current frame image according to the integral image, and extract corner points of the current frame image based on the Harris score. In some instances, the corner points may be the pixels of which Harris score is greater than a predetermined threshold.

In some embodiments, the operation of the processor 40 for estimating estimated areas in a previous frame image within which the corner points in the current frame image locate, according to the current angular velocity of the UAV collected by the gyroscope 20, may comprise the following processes. First, the processor 40 may perform pyramid decomposition on the previous frame image. Next, the processor 40 may integrate the angular velocity collected by the gyroscope 20 over the time interval between the current frame image and the previous frame image to obtain the rotational angle of the UAV during the time interval. Next, for each corner point in the current frame image, the processor 40 may calculate the corresponding pixel displacement in the top image layer of the previous frame image based on the rotational angle. Then, based on the pixel displacement, the processor 40 may estimate estimated areas in the top image layer of the previous frame image within which the corner points in the current frame image locate.

In some embodiments, the operation of the processor 40 for searching for the corresponding corner points within the estimated areas in the previous frame image, based on the locations of the corner points in the current frame image, may comprise the following processes. First, the processor 40 may extract corner points from the previous frame image. Next, for respective corner point, the processor 40 may determine if a corner point corresponding to the corner point in the current frame image is found within the estimated area in the previous frame image. Then, the processor may search, in the estimated areas of the previous frame, for corner points corresponding to the corner points of the current frame by pyramid optical flow algorithm.

In some embodiments, the operation of the processor 40 for obtaining the speeds of the corner points according to the corner points in the current frame image and the corresponding corner points in the previous frame image may comprise the following processes. First, for each corner point, the processor 40 may obtain the speed of the corner point in the top image layer by pyramid optical flow method, according to a corner point in the current frame image and a corresponding corner point in the previous frame image. Next, for each corner point, the processor 40 may successively obtain the speed of a corner point in respective other image layers by pyramid optical flow method, according to the speed of the corner point in the top image layer. In some instances, the speed of corner point in the bottom image layer in the pyramid may be the speed of the corner point.

In some embodiments, the operation of the processor 40 for obtaining pixel velocity according to the speeds of corner points may comprise the following processes. First, the processor 40 may obtain an average value of the speeds of corner points as a first average value. Next, the processor 40 may determine a correlation between a speed of each corner point and the first average value. Then, the processor 40 may obtain an average value of the speeds of the corner points, which are positively correlated with the first average value, as a second average value. In some instances, the second average value may be the pixel velocity.

Alternatively, the operation of the processor 40 for obtaining pixel velocity according to the speeds of corner points may comprise the following processes. The processor 40 may obtain the histogram of the speeds of corner points, and perform low-pass filtering on the histogram. In some instances, the mode obtained from the filtered histogram may be the pixel velocity.

Figure 2:
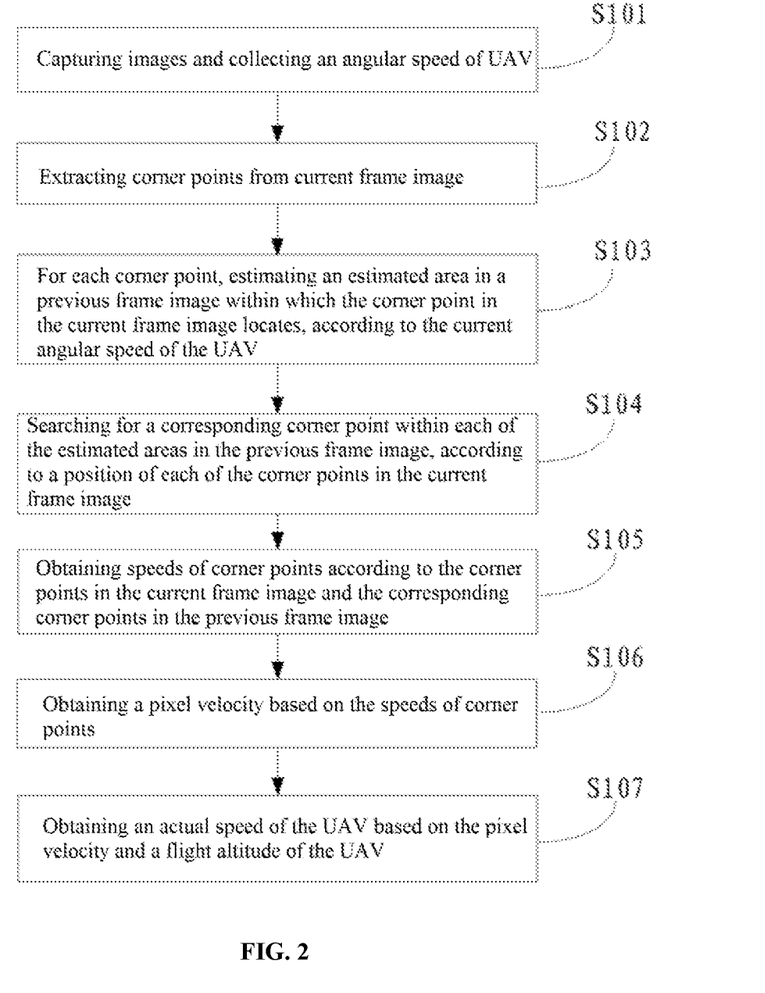
FIG. 2 is a flow chart of a method for measuring flight parameters of a UAV, according to a first embodiment of the present disclosure.

FIG. 2 is a flow chart of a method for measuring flight parameters of a UAV, according to a first embodiment of the present disclosure. The method of FIG. 2 may be executed by the flight parameter measuring device of FIG. 1. It should be noted that, the method of present disclosure is not limited to the flow sequence as shown in FIG. 2 given that substantially same result can be obtained. As shown in FIG. 2, the method of present disclosure may comprise the following steps.

Step S101: capturing images and collecting the angular velocity of a UAV.

In step S101, the images may be obtained by the image sensor 10 at a first preset frequency, and the angular velocity of the UAV may be collected by the gyroscope 20 at a second preset frequency.

Step S102: extracting corner points from a current frame image.

In step S102, the corner points may be extracted from current frame image by the processor 40 by using Kitchen-Rosenfeld corner detection algorithm, Harris corner detection algorithm, KLT corner detection algorithm or SUSAN corner detection algorithm. In some instances, a pixel of which the gray-scale varies significantly compared with that of the adjacent pixel points may be considered as a corner point.

Step S103: for each corner point, estimating an estimated area in a previous frame image within which the corner points in the current frame image locate, according to the current angular velocity of the UAV.

In step S103, the angular velocity collected over a time interval between the current frame image and the previous frame image may be integrated by the processor 40 to obtain the rotational angle of the UAV during the time interval. Next, for each corner point, a pixel displacement during the time interval between the current frame image and the previous frame image, which is caused by the rotation of the UAV, may be obtained based on the rotational angle. Then, based on the pixel displacement, an estimated area in the previous frame image within which each corner point in the current frame image locates may be estimated.

Step S104: searching for a corresponding corner point within each of the estimated areas in the previous frame image, according to the position of each of the corner points in the current frame image.

In step S104, the estimated area may be a square area or an area having other shapes, which is not limited herein. The size of the estimated area may be determined according to an actual situation. In some instances, a smaller estimated area may be selected if the accuracy in extracting the corner points is to be increased.

In step S104, first, the processor 40 may extract corner points in the previous frame image by using Kitchen-Rosenfeld corner detection algorithm, Harris corner detection algorithm, KLT corner detection algorithm or SUSAN corner detection algorithm. Next, for the corner points, the processor 40 may determine if a corner point corresponding to the corner point in the current frame image is found within the estimated area in the previous frame image. Then, the processor may search, in the estimated areas of the previous frame, for corner points corresponding to the corner points of the current frame by pyramid optical flow algorithm.

Step S105: obtaining the speeds of corner points according to the corner points in the current frame image and the corresponding corner points in the previous frame image.

In step S105, the speed of a corner point may be obtained by the processor 40 according to the corner point in the current frame image and the corresponding corner point in the previous frame image, by using pyramid optical flow method or block matching optical flow method. In some instances, the block matching approach in the block matching optical flow method may be a sum of absolute distance (SAD) or a sum of squared distance (SSD).

Step S106: obtaining pixel velocity based on the speeds of corner points.

In step S106, the pixel velocity may be obtained by the processor 40 according to the speeds of the corner points by using the following two methods.

The first method may comprise the following processes. First, obtaining the average value of the speeds of corner points as a first average value. Next, determining the correlation between the speed of each corner point and the first average value. In some instances, if the speed of a corner point is positively correlated with the first average value, the speed of the corner point may be determined as approaching the correct pixel velocity; otherwise, the speed of the corner point may be determined as deviating from the correct pixel velocity. Then, obtaining an average value of the speeds of those corner points, which are positively correlated with the first average value, as a second average value. In some instances, the second average value may be the pixel velocity.

The second method may comprise the following processes. First, obtaining a histogram of the speeds of corner points. In some instances, the histogram may include a one-dimensional histogram in the horizontal direction and in the vertical direction. Next, performing low-pass filtering on the histogram. In some instances, a mode obtained from the filtered histogram may be the pixel velocity. For instance, the speed of corner point having the highest frequency of occurrence within the histogram may be considered as the mode.

Step S107: obtaining the actual speed of the UAV based on the pixel velocity and the flight altitude of the UAV.

In step S107, the processor 40 may obtain a rotational pixel velocity caused by the rotation of UAV based on the angular velocity, obtain the translational pixel velocity of the UAV caused by the translation of UAV by subtracting the rotational pixel velocity from the pixel velocity obtained based on the speeds of the corner points, and obtain an actual speed of the UAV based on the translational pixel velocity and the flight altitude of the UAV.

In some embodiments, the operation of obtaining the actual speed of the UAV based on the translational pixel velocity and the flight altitude of the UAV may comprise the following processes. First, obtaining the flight altitude of the UAV by the altimeter 30, performing median filtering and low-pass filtering on the obtained flight altitude. Then, converting the translational pixel velocity into the actual speed of the UAV based on the filtered flight altitude, the focal length of the lens in the image sensor 10, the intrinsic parameters of the image sensor 10 and the frequency of executing the algorithm.

In some embodiments, after the actual speed of the UAV is calculated, the calculated actual speed may be verified based on four criteria to determine if it is a reasonable speed. The four criteria may comprise: (1) whether there is a jump in the flight altitude obtained by the altimeter 30 during the time interval between the current frame image and the previous frame image; (2) whether the rotational angle of the UAV, which is obtained by integrating the angular velocity collected by the gyroscope 20 during the time interval between the current frame image and the previous frame image, is within a predetermined range; (3) whether the total number of the corner points, which are extracted from the current frame image or the previous frame image, reaches a predetermined number; and (4) whether the percentage of corner points, which approaching the correct pixel velocity, reaches a predetermined requirement. In some instances, in calculating the actual speed of the UAV, the calculated actual speed may be determined as a reasonable speed if the four criteria are simultaneously satisfied.

In some instances, in steps S102, S104 and S105, the SIMD instruction set of the processor may be utilized to perform synchronous calculation on a plurality of pixels to improve the calculation efficiency of the above processes and reduce the calculation time.

In the aforementioned embodiment, a method of measuring flight parameters of a UAV according to the first embodiment of the present disclosure may first extract corner points from a current frame image; next, estimate corresponding corner points in a previous frame image based on an angular velocity and the corner points in the current frame image; next, appropriately process the corner points in the current frame image and the corresponding corner points in the previous frame image to determine a pixel velocity; and then, obtain an actual speed of the UAV based on the pixel velocity and a flight altitude of the UAV. Compared with the methods in prior art, the method of present disclosure may calculate the flight parameters of aerial vehicle based on corner points and make pre-compensation to the angular velocity instead of post-compensation, thereby improving an accuracy and a precision of the flight parameters measurement.

Figure 3:
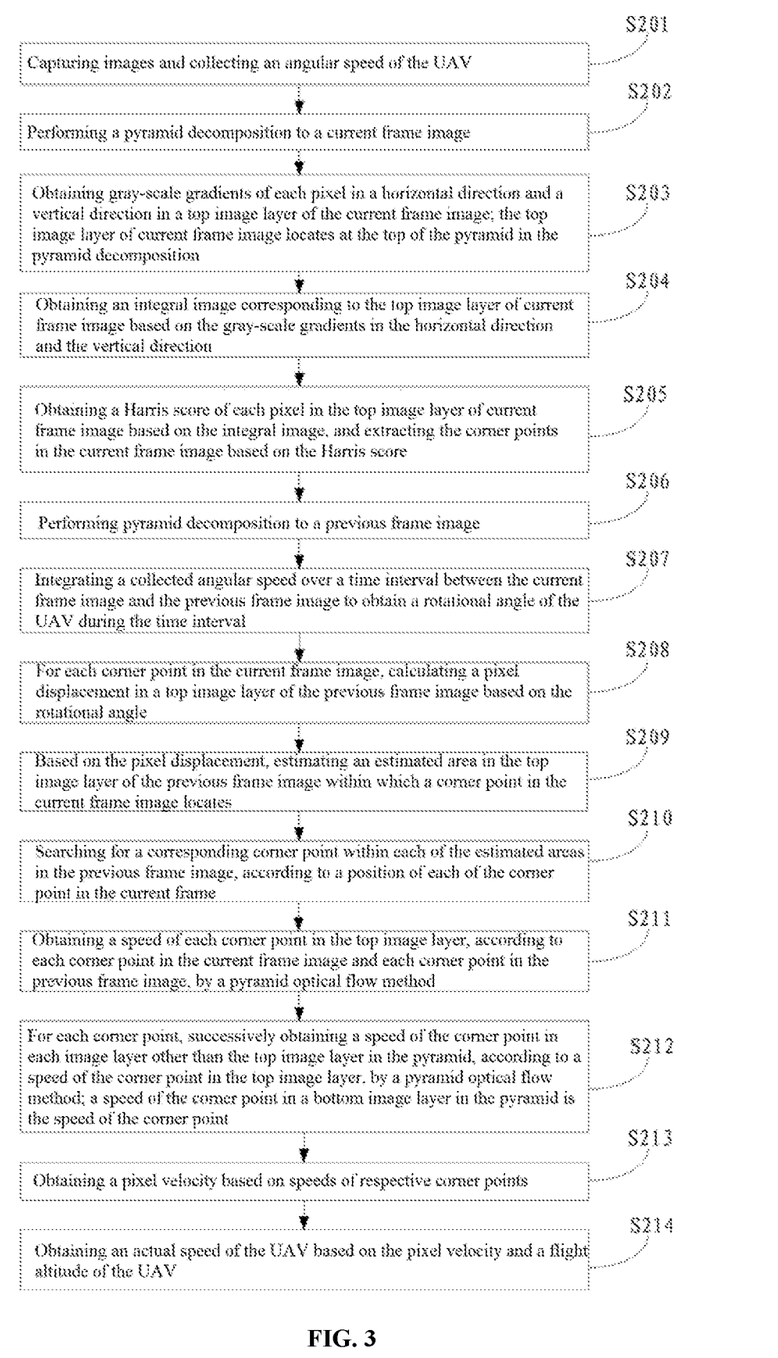
FIG. 3 is a flow chart of a method for measuring flight parameters of a UAV, according to a second embodiment of the present disclosure.

FIG. 3 is a flow chart of a method for measuring flight parameters of a UAV, according to a second embodiment of the present disclosure. The method shown in FIG. 3 may be executed by the flight parameter measuring device of FIG. 1. It should be noted that, the method of present disclosure is not limited to the flow sequence as shown in FIG. 3 given that substantially same result can be obtained. As shown in FIG. 3, the method of present disclosure may comprise the following steps.

Step S201: capturing images and collecting the angular velocity of a UAV.

In step S201, the images may be obtained by the image sensor 10 at a first preset frequency, and the obtained images may be sent to the processor 40 via a DCMI interface or an LVDS interface. In some instances, the image sensor 10 may be an MT9V034 supporting a maximum resolution of 752× 480. In some instances, the first preset frequency may be 50 Hz (Hertz).

For instance, the resolution of the images may be set to 480×480. After an image having a resolution of 480×480 is obtained by the image sensor 10 at the first preset frequency, the image having a resolution of 480×480 may be down sampled by hardware to obtain an image having a resolution of 120×120, in order to satisfy the limitation of memory of the processor 40. The image having a resolution of 120×120 may be sent to the processor 40 via a DCMI interface or a LVDS interface. The above mentioned numerical values and any numerical value listed hereinafter are merely illustrative examples, and the present disclosure is not limited thereto.

In some embodiments, the angular velocity of UAV may be collected by the gyroscope 20 at a second preset frequency. The angular velocity of UAV may be sent to the processor 40 via an I2C interface. In some instances, the second preset frequency may be a high frequency, such as 1 KHz (kilohertz).

In some instances, the processor 40 may be a processor supporting an SIMD instruction set, such as a Cortex M4 processor. For instance, the Cortex M4 processor may support the Thumb instruction set. The SIMD instruction set may be a subset of the Thumb instruction set. For instance, the Cortex M4 processor may be equipped with a hardware float point unit (FPU), which significantly improves a processing speed of floating-point calculation.

Step S202: performing pyramid decomposition on a current frame image.

In step S202, the processor 40 may perform pyramid decomposition on the current frame image by Gaussian down-sampling or median down-sampling. In some instances, the number of layers of the decomposition may be determined according to an actual situation.

For instance, after a current frame image having a resolution of 120×120 is obtained, the processor 40 may decomposes the image into three image layers by Gaussian down-sampling or median down-sampling, The three image layers may include an image layer having a resolution of 30×30 at the top of the pyramid (referred to as a "top image layer"); an image layer having a resolution of 60×60 in the middle of the pyramid; and an image layer having a resolution of 120×120 at the bottom of the pyramid.

Step S203: obtaining gray-scale gradients of each pixel in the horizontal direction and the vertical direction in the top image layer of the current frame image. The top image layer of current frame image may locate at the top of the pyramid in the pyramid decomposition.

In step S203, for instance, for each pixel in the top image layer, a gray-scale gradient Ix in the horizontal direction and a gray-scale gradient Iy in the vertical direction may be calculated by the processor 40. The top image layer of the current frame image may have a resolution of 30×30.

A gray-scale gradient may be described as a value obtained by deriving a two-dimensional discrete function if an image is described by the two-dimensional discrete function. In some instances, the direction of the gray-scale gradient may coincide with the direction of maximum change rate of the image gray-scale, which may reflect a change in gray-scale on the edges of the image.

In some instances, the gray-scale gradient may be a difference in pixel values of adjacent pixels, for example, Ix=P(i+1, j)−P(I, j), and Iy=P(I, j+1)−P(I, j). Optionally, the gray-scale gradient may be a median difference, i.e., Ix=[P(i+1, j)−P(i−1, j)]/2, and Iy=[P(I, j+1)−P(I, j−1)]/2, wherein P is the pixel value of a pixel, and (i, j) is the coordinate of the pixel. Optionally, the gray-scale gradient may be calculated by other calculation formulas.

In some embodiments, in the process of calculating the gray-scale gradients Ix and Iy, the SIMD instruction set may be used to perform synchronous calculation on a plurality of pixels, in order to increase the calculation speed. For instance, by virtue of array characteristic, every 4 bytes having successive addresses may be combined into a 32-bit integer, and a calculation may be performed by using the SIMD instruction set with a calculation speed four times faster.

Step S204: obtaining an integral image corresponding to the top image layer of current frame image based on the gray-scale gradients in the horizontal direction and the vertical direction.

In step S204, for instance, an integral image corresponding to the top image layer (having a resolution of 30×30) of the current frame image may be obtained by the processor 40 based on the gray-scale gradients Ix and Iy of each pixel. Further, values of $Ix^2$, $I_y^2$ and $I_xI_y$ of each pixel in the top image layer may be calculated based on the integral image.

In some embodiments, in the process of calculating the integral image, the Thumb instruction set may be used to increase a speed of calculating the integral image. For instance, instructions such as _SMLABB, _SMLABT, _SMLATB in the Thumb instruction set may be used to complete a multiplication and addition calculation on a 16-bit integer in one clock cycle, thereby increasing the speed of calculating the integral image.

Step S205: obtaining the Harris score of each pixel in the top image layer of current frame image based on the integral image, and extracting corner points in the current frame image based on the Harris score.

In step S205, for instance, the Harris score of each pixel in the top image layer (having a resolution of 30×30) of the current frame image may be calculated based on the following formulae:

$$H = \det(M) - \lambda \times tr(M)^2;$$

$$M = \begin{bmatrix} \sum I_x^2 & \sum I_xI_y \\ \sum I_xI_y & \sum I_y^2 \end{bmatrix};$$

Wherein H is the Harris score, det(M) is the determinant of the matrix M tr(M) is the trace of the matrix M (the sum of eigenvalues of the matrix M), λ is a preset constant, and a summation of $I^2$, $I_y^2$ and $I_xI_y$ in the matrix M is performed in a predefined square area.

In some embodiments, after the Harris score of each pixel is calculated, the processor 40 may perform a maximum suppression on the Harris score of each pixel in order to extract relatively non-redundant corner points. In some instances, the maximum suppression may be implemented in the following manner. First, pixels may be sorted by the processor 40 according to the Harris score of each pixel, by using such as a heap sort. Next, from the sorted pixels, those pixels having a Harris score greater than a predetermined threshold may be extracted. For instance, a pixel having a Harris score greater than the predetermined threshold may be a corner point. Then, in a descending order of Harris score of the corner points, the processor 40 may check whether other corner points can be found within the predefined square area of corner point. If other corner points are found within the predefined square area of corner point, the other corner points appeared in the predefined square area may be determined as invalid corner points and may be discarded.

In some instances, in the process of calculating the Harris score, an FPU may be used to perform the floating-point calculation if any calculation on floating points is involved, thereby improving the precision and the speed in calculating the Harris score.

Step S206: performing pyramid decomposition on a previous frame image.

In step S206, the pyramid decomposition on the previous frame image may be similar to the pyramid decomposition to the current frame image in step S202, and the number of layers of the previous frame image and the resolution of each image layer after the decomposition may be same as those of the current frame image, therefore, description to the process of pyramid decomposition is omitted for briefness.

Step S207: integrating the collected angular velocity over the time interval between the current frame image and the previous frame image to obtain the rotational angle of the UAV during the time interval.

In step S207, the processor 40 may integrate the high-frequency samples on the angular velocity of UAV, to calculate the rotational angle of UAV during the time interval between the current frame image and the previous frame image. For instance, the sampling frequency may be 1 KHz.

In some instances, the angular velocity of UAV sampled by the gyroscope 20 may be transmitted to the processor 40 via a hardware interface I2C. The processor 40 may read the angular velocity at a high speed by virtue of a fast and stable transmission of I2C interface. In some instances, with a fast sampling of angular velocity by the gyroscope 20, the processor 40 may obtain the angular velocity values with a wide range and a high precision.

Step S208: for each corner point in the current frame image, calculating a pixel displacement in the top image layer of the previous frame image based on the rotational angle.

In step S208, for instance, for each corner point in the current frame image, the processor 40 may calculate a pixel displacement in the top image layer (having a resolution of 30×30) of the previous frame image based on the rotational angle. For instance, each corner point in the current frame image may be extracted from the top image layer (having a resolution of 30×30) of the current frame image.

Step S209: based on the pixel displacement, estimating an estimated area in the top image layer of the previous frame image within which a corner point in the current frame image locates.

In step S209, for instance, the processor 40 may estimate an estimated area in the top image layer (having a resolution of 30×30) of the previous frame image within which a corner point in the current frame image locates, based on the pixel displacement.

Step S210: searching for a corresponding corner point within each of the estimated areas in the previous frame image, according to the position of each of the corner point in the current frame.

In step S210, for instance, the operation of the processor 40 for searching for the corresponding corner points within the estimated areas in the previous frame image, based on the locations of the corner points in the current frame image, may comprise the following processes. The processor 40 may first extract corner points in the previous frame image. In some instances, each corner point in the previous frame image may be extracted from the top image layer (having a resolution of 30×30) of the previous frame image. Next, the processor 40 may determine, in the top image layer (having a resolution of 30×30) of the previous frame image, whether a corner point can be found within each of the estimated area which is corresponding to each of the corner points in the current frame image. Then, the processor 40 may search, within each of the estimated areas of the previous frame, for corner point corresponding to the corner point of the current frame by a pyramid optical flow algorithm.

Step S211: obtaining the speed of each corner point in the top image layer, according to each corner point in the current frame image and each corner point in the previous frame image, by a pyramid optical flow method.

In step S211, for instance, for each corner point, the processor 40 may calculate a difference between pixels in the predefined square area of a corner point in the current frame image and pixels in the predefined square area of a corresponding corner point in the previous frame image. Then, the processor 40 may calculate a speed of the corner point in the top image layer (having a resolution of 30×30) by a pyramid optical flow method, based on gray-scale gradients of each pixel in horizontal direction and vertical direction in the predefined square area of the corner point in current frame image.

In some instances, if the calculated speed is a floating number, for the accuracy of calculation, a predefined square area may be obtained by interpolating around each corner point in the previous frame image. The above calculation steps may then be executed.

In some instances, in the pyramid optical flow method, Thumb instruction set may be used to increase a speed of calculation. For instance, instructions such as SMLABB, SMLABT, SMLATB in the Thumb instruction set may be used to complete a multiplication and addition calculation of a 16-bit integer in one clock cycle, thereby increasing the speed of calculation.

Step S212: for each corner point, successively obtaining the speed of the corner point in each image layer other than the top image layer in the pyramid, according to the speed of the corner point in the top image layer, by a pyramid optical flow method. In some instances, a=the speed of the corner point in the bottom image layer in the pyramid may be the speed of the corner point.

In step S212, for instance, for each corner point, the processor 40 may first estimate an initial position of a corner point in an image layer having a resolution of 60×60, based on a speed of the corner point in the top image layer having a resolution of 30×30. Next, the processor 40 may obtain the speed of the corner point in the image layer having a resolution of 60×60 by a pyramid optical flow method. Next, the processor 40 may estimate an initial position of the corner point in an image layer having a resolution of 120×120, based on the speed of the corner point in the image layer having a resolution of 60×60. Then, the processor 40 may obtain the speed of the corner point in an image layer having a resolution of 120×120 by the pyramid optical flow method. The speed of the corner point in the image layer having a resolution of 120×120 may be the speed of the corner point.

Step S213: obtaining a pixel velocity based on the speeds of the corner points.

Step S214: obtaining the actual speed of the UAV based on the pixel velocity and the flight altitude of the UAV.

In some embodiments, steps S213 and S214 may be similar to steps S106 and S107 of FIG. 2. A description to steps S213 and S214 are omitted for briefness.

In the aforementioned embodiment, a method of measuring flight parameters of a UAV according to the second embodiment of the present disclosure may first extract corner points from current frame image by a pyramid image method; next, estimate corresponding corner points in previous frame image based on an angular velocity and the corner points in the current frame image; next, process the corner points in the current frame image and corresponding corner points in the previous frame image to determine a pixel velocity by the pyramid optical flow method; then, obtain an actual speed of the UAV based on the pixel velocity and a flight altitude of the UAV. Compared with the methods in prior art, the method of present disclosure may determine the flight parameters of UAV based on corner points and make pre-compensation to the angular velocity instead of post-compensation, thereby improving an accuracy and a precision of the flight parameters measurement. Meanwhile, by using a pyramid decomposition method, the present disclosure may expand a measurement range of UAV flight parameters. Furthermore, the present disclosure may improve a speed and precision in calculating UAV flight parameters by using a processor supporting SIMD instructions and an FPU.

The foregoing disclosure is merely illustrative of the embodiments of the disclosure but not intended to limit the scope of the disclosure. Any equivalent structural or equivalent flow changes, which are made without departing from the specification and the drawings of the disclosure, and a direct or indirect application in other relevant technical field, shall also fall into the scope of the disclosure.

What is claimed is:

1. A method of measuring at least one flight parameter of an unmanned aerial vehicle (UAV), said method comprising:
    capturing a plurality of frame images by an image sensor;
    extracting corner points from a current frame image captured at a first time;
    estimating, for each of the corner points in the current frame image, a corresponding point in a previous frame image based on the position of each of the corner points in the current frame image, wherein the previous frame image is captured before the first time;
    obtaining a speed of each of the corner points based on each corner point in the current frame image and its corresponding point in the previous frame image;
    obtaining a pixel velocity based on the speeds of the corner points; and
    obtaining an actual speed of the UAV based on the pixel velocity and a flight altitude of the UAV.

2. The method of claim 1, wherein the step of obtaining the actual speed of the UAV based on the pixel velocity and a flight altitude of the UAV includes obtaining the actual speed of the UAV based on a translational pixel velocity, the flight altitude of the UAV, and a focal length of a lens in the image sensor.

3. The method of claim 2, wherein the step of estimating, for each of the corner points in the current frame image, the corresponding corner point in a previous frame image includes:
    determining an angular velocity of the UAV;
    estimating, for each of the corner points in the current frame image, an estimated area in the previous frame image within which the corner point in the current frame image would be located, based on the angular velocity of the UAV; and
    searching for the points within each of the estimated areas in the previous frame image corresponding to the corner points in the current frame image.

4. The method of claim 3, wherein frame images in the plurality of frame images are captured at a first frequency and the angular velocity is determined at a second frequency.

5. The method of claim 2, wherein the step of obtaining the actual speed of the UAV based on the pixel velocity and a flight altitude of the UAV includes:
    obtaining a rotational pixel velocity of the UAV based on an angular velocity caused by a rotation;
    obtaining a translational pixel velocity of the UAV caused by a translation by subtracting the rotational pixel velocity caused by the rotation from the pixel velocity obtained based on the speeds of the corner points; and
    obtaining the actual speed of the UAV based on the translational pixel velocity, the flight altitude of the UAV, and a focal length of a lens in the image sensor.

6. The method of claim 5, wherein the step of obtaining the actual speed of the UAV based on the translational pixel velocity, the flight altitude of the UAV, and a focal length of the lens in the image sensor includes converting the translational pixel velocity into the actual speed of the UAV based on the flight altitude of the UAV, the focal length of the lens in the image sensor, an intrinsic parameter of the image sensor, and a frequency of executing the algorithm.

7. The method of claim 1, further comprising verifying the obtained actual speed of the UAV.

8. The method of claim 7, wherein the step of verifying the obtained actual speed of the UAV is based on at least one criterion, wherein the criterion includes:
    whether there is a jump in the flight altitude between the first time and a time when the previous frame image is captured;
    whether a rotational angle of the UAV obtained based on the angular velocity between the first time and the time when the previous frame image is captured is within a predetermined range;
    whether a total number of the corner points, extracted from the current frame image or the previous frame image, reaches a predetermined number; or
    whether a percentage of corner points approaching a correct pixel velocity reaches a predetermined requirement.

9. The method of claim 8, further comprising:
    obtaining an average value of the speeds of the corner points;
    determining, for each of the corner points, a correlation between the speed of the corner point and the average value of the speeds of the corner points; and
    determining, for each of the corner points, whether the corner point is approaching a correct pixel velocity based on the determined correlation being a positive correlation.

10. The method of claim 7, wherein the step of verifying the obtained actual speed of the UAV includes determining the obtained actual speed of UAV is reasonable when a plurality of the criteria is satisfied.

11. A device for measuring at least one flight parameter of an unmanned aerial vehicle (UAV), said device comprises:
    an image sensor configured to capture a plurality of frame images;
    an altimeter configured to obtain a flight altitude of the UAV; and a processor electrically connected with the image sensor and the altimeter, said processor being configured to:

extract corner points from a current frame image captured at a first time;

estimate, for each of the corner points in the current frame image, a corresponding point in a previous frame image based on the position of each of the corner points in the current frame image, wherein the previous frame image is captured before the first time;

obtain a speed of each of the corner points based on each corner point in the current frame image and its corresponding point in the previous frame image;

obtain a pixel velocity based on the speeds of the corner points; and obtain an actual speed of the UAV based on the pixel velocity and a flight altitude of the UAV.

12. The device of claim 11, wherein the processor is further configured to obtain the actual speed of the UAV based on the translational pixel velocity, the flight altitude of the UAV, and a focal length of a lens in the image sensor.

13. The device of claim 12, wherein the device further includes a gyroscope configured to determine an angular velocity of the UAV, and the processor is further configured to:

estimate, for each of the corner points in the current frame image, an estimated area in the previous frame image within which the corner point in the current frame image locates, based on the angular velocity of the UAV; and search for the points within each of the estimated areas in the previous frame image corresponding to the corner points in the current frame image.

14. The device of claim 13, wherein image frames in the plurality of image frames are captured at a first frequency and the angular velocity is determined at a second frequency.

15. The device of claim 12, wherein the processor is further configured to:

obtain a rotational pixel velocity of the UAV based on an angular velocity caused by a rotation;

obtain a translational pixel velocity of the UAV caused by a translation by subtracting the rotational pixel velocity caused by the rotation from the pixel velocity obtained based on the speeds of the corner points; and obtain the actual speed of the UAV based on the translational pixel velocity, the flight altitude of the UAV, and a focal length of a lens in the image sensor.

16. The device of claim 15, wherein the processor is further configured to convert the translational pixel velocity into the actual speed of the UAV based on the flight altitude of the UAV, the focal length of the lens in the image sensor, an intrinsic parameter of the image sensor, and a frequency of executing the algorithm.

17. The device of claim 11, wherein the processor is further configured to verify the obtained actual speed of the UAV.

18. The device of claim 17, wherein the processor is further configured to verify the obtained actual speed of the UAV based on at least one criterion, wherein the criterion includes:

whether there is a jump in the flight altitude between the first time and a time when the previous frame image is captured;

whether a rotational angle of the UAV obtained based on the angular velocity between the first time and the time when the previous frame image is captured is within a predetermined range;

whether a total number of the corner points, extracted from the current frame image or the previous frame image, reaches a predetermined number; or whether a percentage of corner points approaching a correct pixel velocity reaches a predetermined requirement.

19. The device of claim 18, wherein the processor is further configured to:

obtain an average value of the speeds of the corner points;

determine, for each of the corner points, a correlation between the speed of the corner point and the average value of the speeds of the corner points; and determine, for each of the corner points, whether the corner point is approaching a correct pixel velocity based on the determined correlation being a positive correlation.

20. The device of claim 17, wherein the processor is further configured to determine the obtained actual speed of UAV is reasonable when a plurality of the criteria is satisfied.

* * * * *